United States Patent
Laucournet et al.

[15] 3,679,315
[45] July 25, 1972

[54] APPARATUS FOR MEASURING THE LIGHT PASSING THROUGH A LIQUID SAMPLE IN A CLOSED FLEXIBLE WALLED CHAMBER

[72] Inventors: Robert Laucournet, L'Hay-Les-Roses; Pierre Turpin, Burs S/Yvette, both of France

[73] Assignee: Hoffman-La Roche Inc., Nutley, N.J.

[22] Filed: Aug. 25, 1970

[21] Appl. No.: 66,747

[30] Foreign Application Priority Data

Sept. 9, 1969 France .................................. 6930619

[52] U.S. Cl. .......................... 356/180, 250/218, 356/201, 356/246
[51] Int. Cl. ............................................. G01n 21/24
[58] Field of Search ........................... 356/39–41, 244, 356/246, 180, 195, 201; 250/218

[56] References Cited

UNITED STATES PATENTS

| | | | |
|---|---|---|---|
| 2,358,992 | 9/1944 | Millikan | 356/41 |
| 3,527,542 | 9/1970 | Penhasi et al. | 356/246 X |

FOREIGN PATENTS OR APPLICATIONS

| | | | |
|---|---|---|---|
| 1,540,510 | 8/1967 | France | 356/246 |

*Primary Examiner*—Ronald L. Wibert
*Assistant Examiner*—Orville B. Chew, II
*Attorney*—Samuel L. Welt, Jon S. Saxe, Bernard S. Leon and Jacob Frank

[57] ABSTRACT

A device for measuring a concentration of a liquid sample in a flexible chamber for containing the sample where a portion of the chamber is defined by a measuring zone including, an operating station having a photometer where pressurizing force means are applied to the chamber to alter the chamber configuration forcing the liquid sample into the chamber area at the measuring zone causing intimate contact with a pair of spaced fixed plates of the photometer to provide for a predetermined sample thickness for measurement purposes.

7 Claims, 3 Drawing Figures

APPARATUS FOR MEASURING THE LIGHT PASSING THROUGH A LIQUID SAMPLE IN A CLOSED FLEXIBLE WALLED CHAMBER

BACKGROUND OF THE INVENTION

1. Field of the Invention

The present invention relates to a technique allowing for, in an automatic operation, the precise measurement of physiologically related data connected with a liquid sample such as blood, urine, etc., contained in a closed chamber and, more particularly to the determination of the level of a given substance in the sample, which might have passed an automatic analysis sequence and been subjected to various treatments, for example mixing, admixing with a given substance, heating, cooling, etc.

2. Description of the Prior Art

In an analyzation system of the type discussed it has been found that in order to permit automatic operation, the sample measurement must be carried out on a definite sample thickness. As is described in French Pat. No. 1,540,510, filed on Aug. 18, 1967 in the name of Jean Guigan and Robert Laucournet, this can be obtained by causing the chambers to pass between two parallel plates at an operating station including a photometer, where at least one of the plates is movable relative to the other.

In such a prior art system the chamber containing the sample to be analyzed is positioned at the operating station between the two plates and then enclosed between the plates on the optical axis of the measuring apparatus, rendering the sample thickness interposed in the radiation field equal to a predefined value. The controls for positioning the successive chambers and parallel plates relative to one another are effected automatically and at a high rate.

Such a photometer thus permits an automatic analysis at a high rate and with good precision. Nevertheless, it has been found that it cannot be utilized in the case where the analysis has to be effected with rigorous precision. One reason for the latter disadvantage is the fact that the positioning of the plates can destroy their perfect parallelism, either, among other things, by the very fact of this positioning or by the fact of a lesser precision of the positioning controls resulting from their wear or aging.

SUMMARY

The present invention accordingly has for its aim the realization of a measuring photometer, preserving the advantages of automatic operation and of a high rate of measurement, the measuring precision of which is of the order of 1/1,000.

To accomplish the above, the present invention has for its object a photometer for measuring the concentration of a liquid sample contained in a closed chamber positioned between two fixed parallel-faced plates separated from each other by a distance corresponding to a given thickness on which the measurement has to be taken, the chamber including flexible walls having two measuring zones disposed opposite to each other and to the parallel-faced plates. The sample concentration is determined by measuring the intensity of a radiation traversing the parallel-faced plates whereby the measuring zones are transparent to the radiation. The device includes translationally movable means capable of altering the chamber configuration by compression of at least a portion of the chamber at the time of measurement to ensure intimate contact between the measuring zones and the parallel-faced plates.

The analysis of each sample can be effected by causing the closed chamber containing the sample to be traversed by a radiation of given wavelength and collecting the emergent radiation on a photosensitive element which is thus excited, the output signal of this element being a function of the level in the sample of the substance sought for. The emitted radiation traverses the chamber at the measuring zones.

In accordance with the preferred embodiment of the invention, the means capable of compressing at least a portion of the said chamber comprise shoes disposed at least on both sides of each of the parallel-faced plates, where at least one of the shoes is translationally movable, and where the shoes preferably includes elastic material so as not to impair the wall of the said chamber.

In accordance with another characteristic of the invention, a wetting liquid is injected at the operating station onto the chamber in order to better ensure intimate contact between the said measuring zones carried in the chamber walls and the parallel-faced plates.

The photometer in accordance with the invention, furnishing a precise and rapid measurement of the concentration of a liquid analytical sample, finds application both in laboratory analysis and in industrial instrumentation. It may be inserted at the end of a sequence of collection and treatment of the samples with a view to permitting multiple and automatic analysis of the samples.

Other characteristics and advantages of the present invention will arise more clearly from the description given hereinafter with regard to the attached drawing in which.

Figure 1:
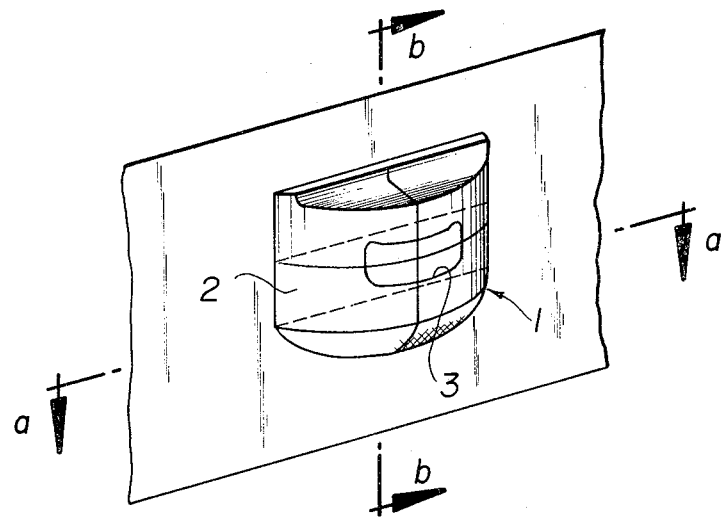
FIG. 1 represents a perspective view of a closed chamber containing a sample to be analyzed.

Shown in FIG. 1 is an analysis chamber containing a sample of the type described for analyzation purposes. Such analysis chambers might include a support member or on the other hand could constitute a part of a continuous analysis film on which a plurality of chambers are regularly spaced such as is illustrated in FIGS. 2 and 3 where the chambers are designated 1,1' and the analysis film is designated as 10.

The chamber shown in the preferred embodiment is formed by joining(such as by gluing, thermo-welding or other procedure) two strips of flexible and transparent material, one of the strips being planar and the other subjected to a stress to be provided with a deformation 2 of which a substantially central zone 3, defining a measuring zone, is unstressed. The two strips, with the exception of the aforesaid portions 2 and 3 and of the opposite portion of the other strip, are joined so as to delimit the closed analysis chambers for the liquid samples which are stored there. The strips when joined, as illustrated, constitute an analysis film provided with closed chambers regularly separated from each other.

Figure 2:
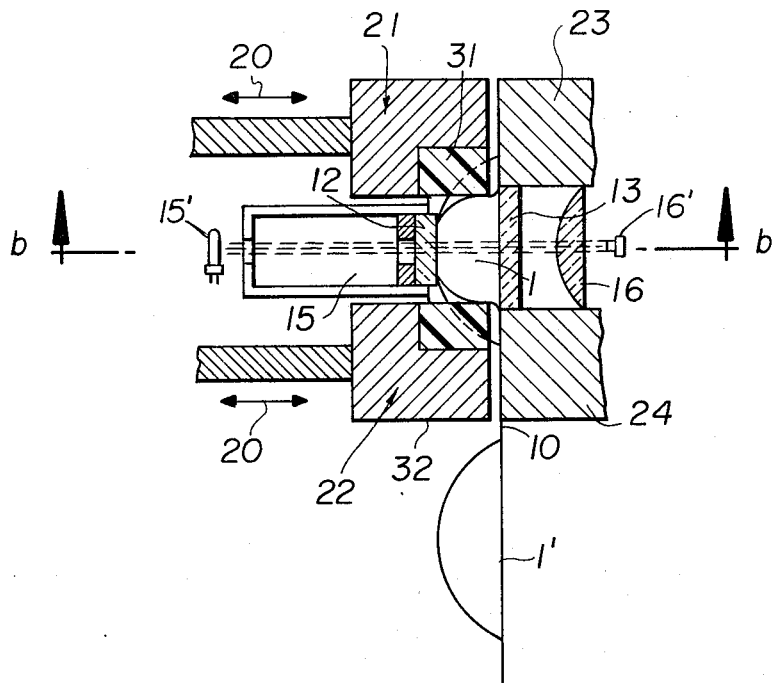
FIG. 2 represents a partial view of the photometer in accordance with the invention in a section along the plane $a$—$a$ of FIG. 1.
Figure 3:
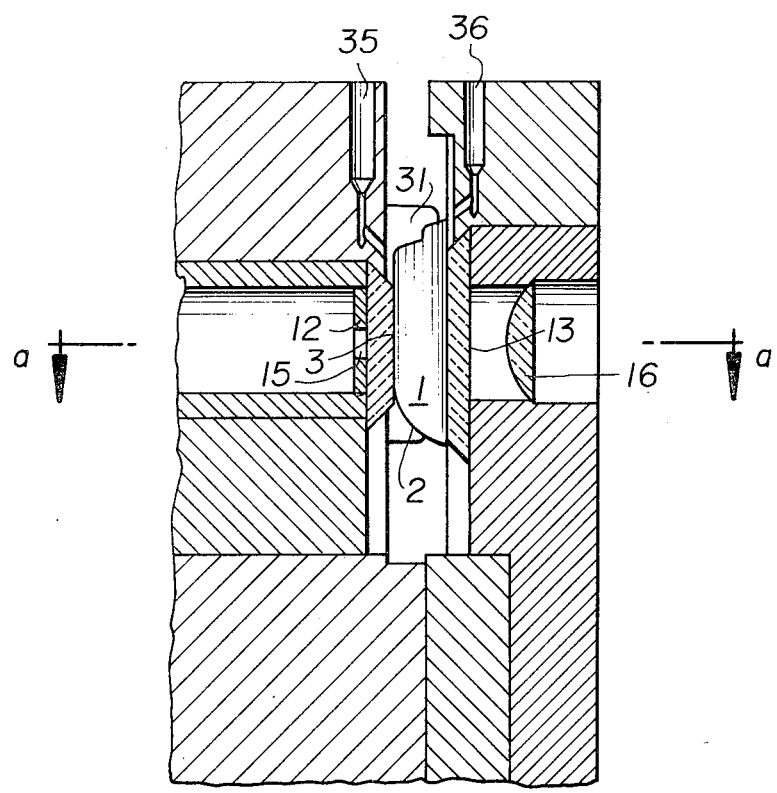
FIG. 3 represents another partial view of the photometer in accordance with the invention in a section along the plane $b$—$b$ of FIG. 1.

In FIGS. 2 and 3, the chamber 1 is positioned at the operating station which includes the photometer, so that the measuring zone 3 on deformed wall 2 and the opposite measuring zone on the other face (transparent to a given radiation), shall be disposed between two fixedly positioned parallel-faced plates 12 and 13. The analysis is effected by emitting the radiation from a light source 15 through a diaphragm 15, and the radiation penetrating plate 12 the sample and plate 13, is collected by way of an optical system including a lens 16 and a photosensitive element 16'. The level of the output signal is representative of the level in a substance sought for of the sample.

The radiation emitted traverses the diaphragm 15 and the parallel-faced plates and the sample. The lens 16 can form part of an optical system collecting either the radiation issued from the sample but not having been subjected to any diffusion, or the totality of the radiation undiffused and diffused by the sample, or by the walls of the measuring chamber, in order to effect an extremely precise measurement on the said sample.

In order to permit measurement on a definite sample thickness corresponding to the constant distance between the plates 12 and 13, the photometer includes two shoes 21 and 22 disposed on both sides of the plate 12. The shoes 21 and 22 are translationally movable in accordance with the arrows 20 and cooperate with two fixed shoes 23 and 24 disposed on both sides of plate 13. The shoes 21 and 22 are driven into position by any appropriate controls, for example by means of screw-jacks enabling shoes 21 and 22 to occupy at least two positions: a first position spaced away from the shoes 23 and 24, permitting easy, or even frictionless, sliding of the chambers between the parallel-faced plates and the shoes 21, 22, 23 and 24; and, a second position whereby shoes 21 and 22 engage and compress interposed portions of the chamber against the shoes 23 and 24. Since these portions are compressed, the liquid sample is repelled or forced into the uncompressed volume and more particularly into the volume between the said parallel-faced plates so that the measuring zone 3 carried by the deformed wall 2 is urged into intimate contact against the plate 12.

The portions 31 and 32 of the movable shoes coming into contact with the chamber walls are preferably made of elastic material (for example of rubber) so as to avoid any impairment of the chamber walls and too harmful a compression force on the sample. Likewise, the form or configuration of portions 31 and 32 will be chosen, quite particularly, in terms of: the size of the measuring zones; the volume of sample to be contained in each chamber; and, the chamber dimensions, so as to avoid too much of a rounded contour effect on the chamber at the measuring zones and, in accordance with the invention, so as to render them virtually planar and to apply them without deformations or folds against the fixedly positioned parallel-faced plates.

In order to ensure an even better contact between the measuring zones and the plates, the photometer is provided with conduits such as 35 and 36 contrived in support members 21, 22 and adapted for liquid discharge above the chamber 1, permitting the injection of a liquid proceeding to wet the walls of the chamber as well as the parallel-faced plates, this liquid being driven away when the measuring zones are applied against the parallel-faced plates, but ensuring a better contact between them. The conduits 35 and 36 are connected through a controlled sluice, pump or analogous device to a reservoir for storing the said liquid.

The present invention in accordance with a slight modification of the preferred embodiment can easily permit the analysis of the sample contained in the chamber 1 to be effected by a differential measurement. To this end, the contents of two adjacent chambers, for example 1 and 1', shown in FIG. 2, may be analyzed simultaneously, the content of one of the chambers being capable of being determined perfectly by other means. In such a corresponding embodiment, the photometer will include two pairs of parallel-faced plates such as 12 and 13 between which will be positioned the measuring zones of the two chambers 1 and 1'. These measuring zones will be applied, in a manner identical to that described above, against the corresponding plates with which they will be in intimate contact by means of the pairs of shoes 21, 23, 22, 24 and of two analogous pairs, whereby the two inner movable shoes (such as 22) can be capable of being constituted by a single symmetrical member in the same way as the corresponding fixed shoes (such as 24).

In brief, one of the advantages of the present invention resides in the precision of the measurement obtained. In fact, the measuring zones of the chamber being of perfectly known material, the device avoids all error due especially to: the value of the thickness of the sample traversed by the radiation; to the positioning and to the lack of parallelism of the plates with respect to each other; to various deformations such as folds and others which are capable of appearing in the measuring zones; and, from the fact that the said plates are fixed and that the measurement on a given thickness of sample is effected after having compressed the edges of the chamber to introduce this thickness of sample onto the path of the radiation.

It should be understood, of course, that the different controls for advancing the chambers, for positioning the movable shoes, for injecting liquid by the conduits 35, 36 and for emitting radiation, can be effected automatically by means of a central sequentially programmed control connected to each individual control.

We claim:

1. A device for measuring a pre-determined thickness value of a concentration of a liquid sample in a closed flexible walled chamber having opposing wall portions, comprising:
    fixedly supported opposing plate means having a transparent portion and spaced at the predetermined thickness value for receiving the chamber therebetween; photometer means for passing radiation through said transparent portions of said plate means and through the opposing wall portions of the chamber, to measure the intensity of the radiation traversing said plate means; and,
    compression means movably positioned adjacent said plate means, for compressing at least a portion of a chamber positioned between said plate means, causing each of said opposing wall portions to be urged into intimate contact with its respective adjacent plate means.

2. A device according to claim 1:
    whereby said opposing wall portions are transparent to said radiation; and,
    said compression means comprises shoe means disposed on both sides of said plate means, at least one of the shoe members being movable to squeeze said chamber to force the liquid sample toward the chamber area between said opposing wall portions.

3. A device according to claim 2 where at least part of the shoe means to squeeze said chamber comprises plastic material so as not to impair the wall of the said chamber.

4. A device according to claim 3 including,
    injection means capable of injecting a wetting liquid onto the said chamber between said plate means to better ensure intimate contact with a chamber wall portion.

5. A device according to claim 4, wherein said injection means includes,
    at least one conduit one extremity of which is adapted to discharge said wetting liquid at an area between one of said plate means and the adjacent chamber wall portion.

6. A device according to claim 1, including diaphragm means disposed in the path of the radiation traversing the said plate means and the sample.

7. A device according to claim 6, including
    optical means for receiving the radiation traversing the sample without diffusion as well as the radiation diffused by the sample or the wall portions of the chamber.

* * * * *

UNITED STATES PATENT OFFICE
CERTIFICATE OF CORRECTION

Patent No. 3,679,315　　　　　　　　　　Dated　July 25, 1972

Inventor(s)　Robert Laucournet and Pierre Turpin

It is certified that error appears in the above-identified patent and that said Letters Patent are hereby corrected as shown below:

Column 4, line 44, claim 3

"comprises plastic material"　　should be comprises elastic material

Signed and sealed this 23rd day of January 1973.

(SEAL)
Attest:

EDWARD M. FLETCHER, JR.　　　　　　　ROBERT GOTTSCHALK
Attesting Officer　　　　　　　　　　Commissioner of Patents